(12) United States Patent
Bresolin et al.

(10) Patent No.: US 7,491,323 B2
(45) Date of Patent: Feb. 17, 2009

(54) WATER DISTRIBUTOR DEVICE FOR AQUARIUMS, PONDS AND THE LIKE PROVIDED WITH A POSSIBLE BIOLOGICAL FILTER

(75) Inventors: Valerio Bresolin, Vicenza (IT); Giancarlo Baron, Vicenza (IT); Luigi Signori, Vicenza (IT)

(73) Assignee: Hydor SRL, Vicenza (IT)

( * ) Notice: Subject to any disclaimer, the term of this patent is extended or adjusted under 35 U.S.C. 154(b) by 876 days.

(21) Appl. No.: 10/512,764

(22) PCT Filed: Jun. 5, 2003

(86) PCT No.: PCT/IT03/00354

§ 371 (c)(1),
(2), (4) Date: Oct. 28, 2004

(87) PCT Pub. No.: WO2004/006661

PCT Pub. Date: Jan. 22, 2004

(65) Prior Publication Data

US 2005/0150042 A1     Jul. 14, 2005

(30) Foreign Application Priority Data

Jul. 10, 2002    (IT)    ............. VE2002A0023

(51) Int. Cl.
*A01K 63/04* (2006.01)
*C02F 3/08* (2006.01)

(52) U.S. Cl. .................. 210/150; 210/167.22; 210/619; 119/260

(58) Field of Classification Search ................ 210/150, 210/151, 167.21, 167.22, 619; 119/260; 239/237, 240
See application file for complete search history.

(56) References Cited

U.S. PATENT DOCUMENTS

| | | | |
|---|---|---|---|
| 1,523,609 A | | 1/1925 | Roach |
| 4,277,029 A | * | 7/1981 | Rabitsch ...................... 239/232 |
| 4,559,653 A | | 12/1985 | Mathews |
| 4,708,290 A | * | 11/1987 | Osmond ...................... 239/227 |

FOREIGN PATENT DOCUMENTS

| | | |
|---|---|---|
| GB | 2 134 414 A | 8/1984 |
| JP | 63-218271 * | 9/1988 |
| WO | WO 99/41980 | 8/1999 |

OTHER PUBLICATIONS

International Preliminary Examination Report, completed Jun. 9, 2004. of PCT/IT03/00354.
International Search Report, completed Sep. 3, 2003. of PCT/IT03/00354.

* cited by examiner

*Primary Examiner*—Fred Prince (57) ABSTRACT

In a water distributor device for aquariums, ponds and the like, comprising a main body (30) wherein an impeller (70) is inserted, the impeller (70) is rotated by entering water and is kinematically connected by gears to a nozzle (50) rotatably mounted on the main body (30) and the gears continuously rotates said nozzle (50).

21 Claims, 8 Drawing Sheets

WATER DISTRIBUTOR DEVICE FOR AQUARIUMS, PONDS AND THE LIKE PROVIDED WITH A POSSIBLE BIOLOGICAL FILTER

This is a National Phase Application in the United States of International Patent Application No. PCT/IT2003/000354 filed Jun. 5, 2003, which claims priority on Italian Patent Application No. VE2002A000023 filed Jul. 10, 2002. The entire disclosures of the above patent applications are hereby incorporated by reference.

The present invention relates to a water distributor device for aquariums, ponds and the like, the function of which is to supply a water jet inside an aquarium so that the jet direction continuously changes.

The distributors of this type are used in aquariums wherein, obviously besides the fishes, there are also sea plants and invertebrates. By moving the water, the plants are moved by the water jet which strikes them, thereby an agreeable aesthetical effect is created thus imitating and reproducing what occurs in nature; moreover, a positive water circulation is created which helps the oxygen exchange by means of the air-water change which occurs at the surface, so increasing the growth and the development of the living organisms contained in the aquarium.

These problems increase when the aquarium contains animals and/or vegetable species which live in environments wherein the water movement is a necessary condition for their survival. For example, the animals and the plants of the barrier coral reef, like the anemomes and the corals, not only for growing but also for surviving, need conditions similar to those existing in nature when the currents and the waves strike against the barrier coral reef.

Therefore, different solutions have been developed to make an attempt to imitate as much as possible these particular conditions.

One first solution consists in using at least two water nozzles, each of which generates a water jet with a fixed direction.

Other solutions have been proposed by using a mobile water nozzle, so as to generate a water jet having a variable direction.

A distributor of the prior art of this type is provided with a main body which contains motor means kinematically connected to a mobile water nozzle. The motor means include an impeller and a gear mechanism which transmits the motion from the impeller to the water nozzle.

The impeller is rotated by the kinetic energy of the entering water which usually comes from a pump; the rotation of the impeller rotates the gear mechanism which, in turn, trasmits the motion to the nozzle which is alternately moved.

A particular device of the known prior art comprises an impeller with a rotational axis perpendicular to the direction of the water flow and wherein the blades, which are struck by a tangential water jet, have a spoon-like shape, as in the Pelton turbines. A disk is fixedly mounted on the same shaft of the impeller and has an helical groove on its peripheral and cylindrical surface which forms a screw meshing with a toothed wheel having an axis perpendicular to the axis of the impeller. A pin is fixed on the peripheral position of the toothed wheel and it engages with a glyph crank having a hinged end and a longitudinal groove inside which the pin of the toothed wheel is free to slide. The glyph crank makes swinging movements around its hinged end. The water nozzle, which is fixed to the glyph crank, also makes swinging movements.

Although this device produces a water jet having a variable direction, it has some drawbacks, both of the constructional and functional types.

First of all, the use of an impeller with a tangential flow does not make possible to reach high efficiency and therefore the water jet power is diminished.

Furthemore, due to the dirtiness and sands contained in the water flow, the use of mechanims like the disk with the helical groove, the toothed wheel and the glyph mechanism may cause mulfunctioning in the device, which can also make the device unsuable.

Since the swinging movements of the glyph crank occur on a plane, also the swinging movements of the nozzle and then of the water jet occurs on a plane and do not involve at the same manner all the water of the aquarium.

Therefore, there are quiet areas wherein the movement of water is not sufficient for the above-mentioned purposes.

Moreover, these environments are so particular and delicate that the water needs a specific treatment which does not consist only of a filtering action, since there are animals and/or the organisms sensitive to the life conditions reproduced in the aquariums.

Therefore the aim of the present invention is to make a distributor device which is able to obviate the drawbacks cited with reference to the known devices. This new device has to supply a water jet, the direction of which is variable in space, thus reproducing an effect as similar as possible to that which occurs in nature and with a low-consumption of energy. Moreover, the device has to be reliable and function well for a long time.

Finally, it has to be possible to mount a filter onto the device for reducing, or also eliminating, the toxins generated by the living organisms contained in the aquarium, in order to regenerate and restore the ideal life conditions.

These aims are reached by a device of the iniatially indicated type, namely comprising a main body containing motor means kinematically connected to a mobile water nozzle, said motor means including an impeller which is rotated by the kinetic energy of the water entering into said distributor device and a gear mechanism designed to kinematically connect said impeller with said nozzle, so as to move said nozzle, characterized in that said nozzle is rotatably mounted on said main body so as to rotate around a rotational axis and said gear mechanism continuously rotates said nozzle.

It is clear that the nozzle is moved with a circular continuous motion, a regular motion which allows for the simplification of the gears contained inside the distributor.

In addition, the impeller rotates around an axis substantially parallel to the axis of the direction of the water flow, so as to use an impeller with an essentially axial flow.

In such a way the efficiency is higher and this allows for energy reduction.

In particular, the nozzle comprises an essentially cylindrical portion rotatably coupled to said main body, and an essentially semispheric end cup divided in two portions, a first portion lowered with respect to a second portion, so as to form said outlet for the water flow, oriented in an angled direction with respect to the rotational axis of the nozzle.

In so doing, the water comes out with a spacial distribution and the outgoing flow creates a whirlpool which allows for the complete circulation of the water in the aquarium.

Finally, a biological aerobic filter is mounted on said rotating nozzle, so that said filter rotates together with said nozzle.

The filter is positioned inside an aquarium so that said outlet is completely immersed in water and said filter is partly immersed in water so that the aerobic bacteria contained therein destroys the toxins in the aquarium, carrying out a biological filtering action, and the other part is in contact with air so that the aerobic bacteria, in contact with the oxygen of the air, may regenerate assuring the correct functioning of the filter.

Another advantage of the invention is that it avoids the necessity of correctly positioning the filter's height, so that it is partly immersed in water and partly outside water according to the quantity of water contained in the aquarium and, therefore, the distributor does not need suitable means for its correct positioning.

Another aim is to reduce the visual impact of the distributor coupled with the aerobic rotating filter.

These further aims are reached by a distributor device comprising a covering element positioned above said aerobic rotating filter and able to cover at least an upper portion of said aerobic rotating filter.

In particular, said covering element is placed at a prefixed distance from said aerobic rotating filter, so that a chamber is defined between said aerobic rotating filter and said covering element.

More specifically, said chamber is able to trap part of the air released by the water jet generated by the nozzle when said distributor device is positioned in such a way that said rotating filter is completely immersed in water, so creating an air chamber which makes it possible to aerobically regenerate the rotating filter.

In such a way it is possible to completely immerse the aerobic rotating filter without compromising its functionality. In fact, thanks to the covering element, an amount of the air contained in the water jet of the distributor, due to unavoidable losses in the distributor, goes up and is channelled between the aerobic rotating filter and the covering element, so forming an air chamber which allows for the regeneration of bacteria contained in the aerobic filter.

Furthermore, since the filter is completely immersed in water the visual impact is remarkably reduced.

These and other advantages of the invention will be more evident by the following detailed description of an embodiment of the invention given for an exemplyfing and non limiting purpose, with reference to the subsequent drawings wherein.

Figure 1:
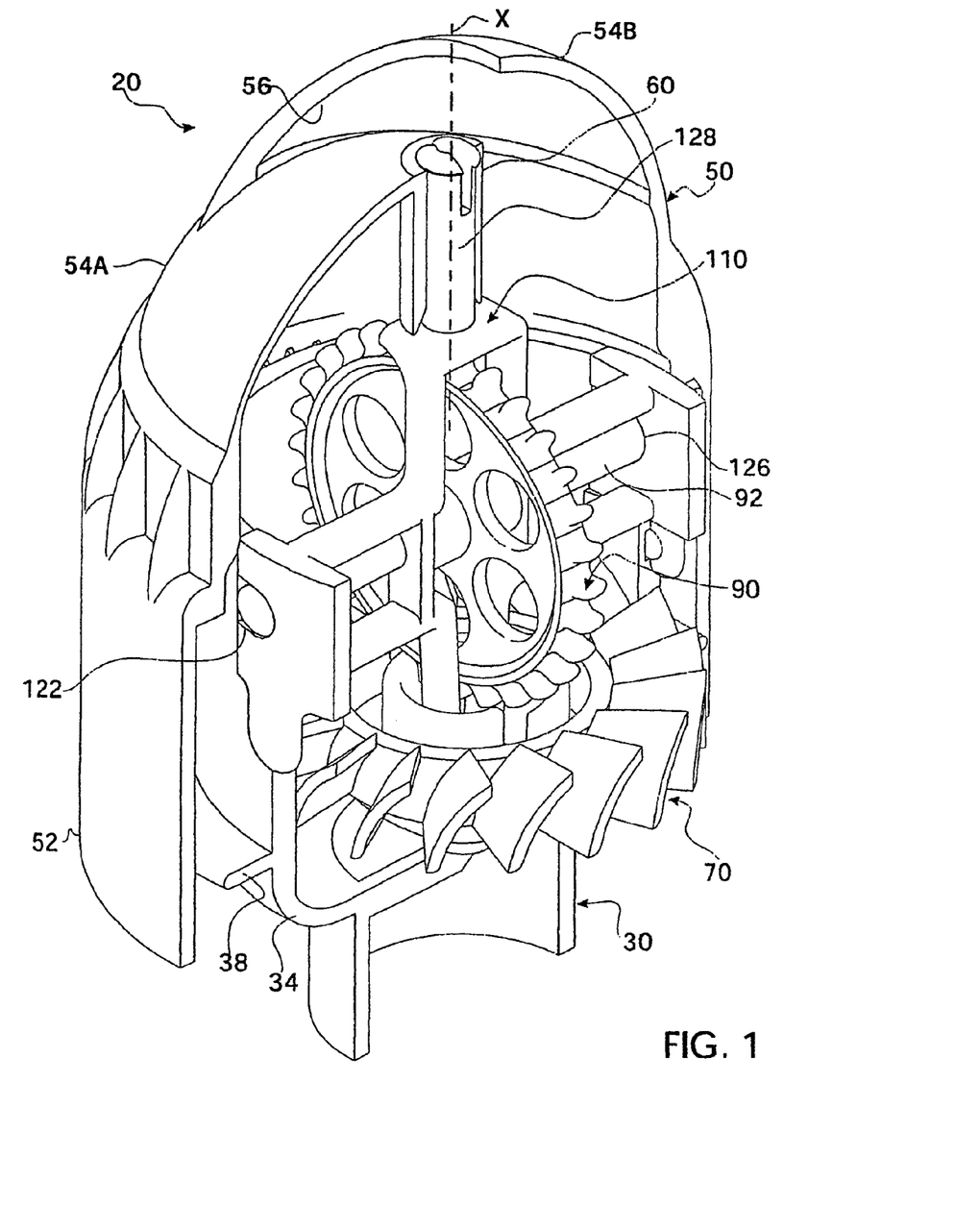
FIG. 1 is a partially sectioned perspective view of a water distributor according to the present invention.

In FIG. 1 a water distributor for aquariums, ponds and the like is entirely indicated with reference 20. The water distributor 20 comprises a main body 30 coupled to a nozzle 50 inside which there are an impeller 70, a gear 90 and a support 110.

For sake of exposition, there will be described in succession the single components of the water distributor 20 and, thereafter, it will be explained how they are mounted and the functioning of the entire device.

Figure 2:
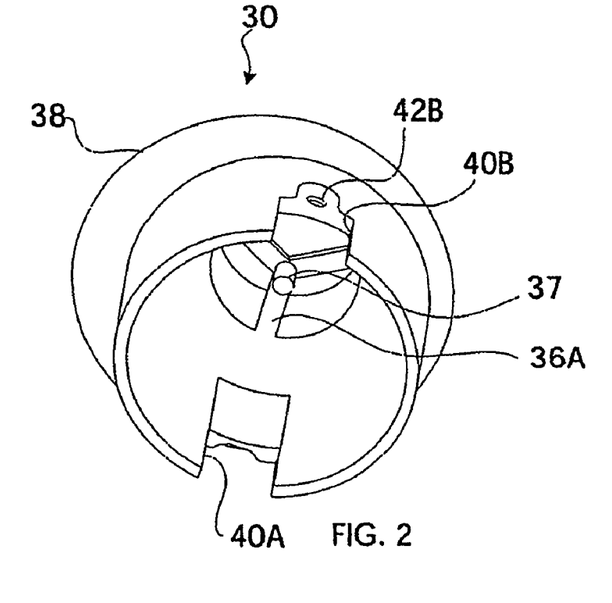
FIGS. 2, 3 and 4 are respectively perspective, longitudinal and top views of the main body of the distributor of FIG. 1.
Figures 3, 4:
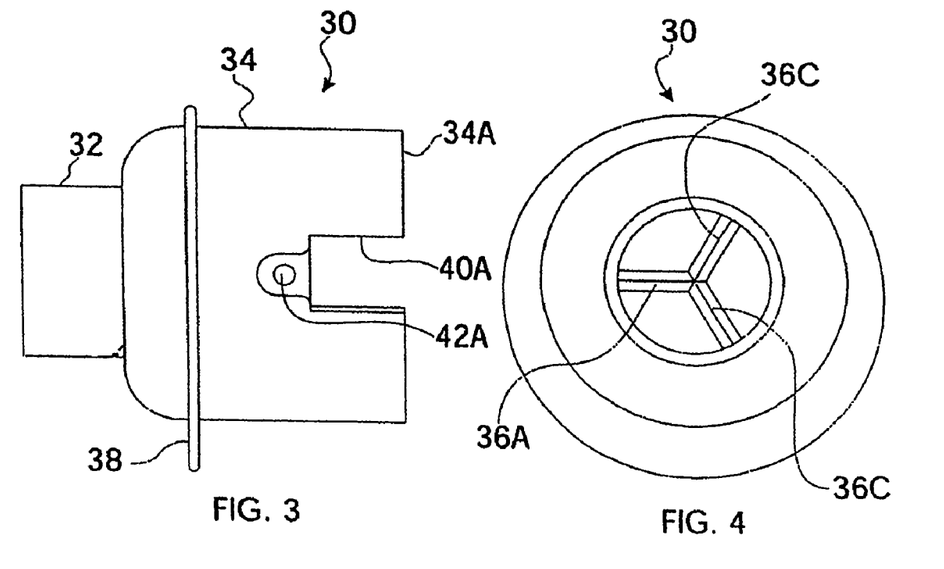

The main body 30, as shown in FIGS. 2, 3 and 4, comprises a first cylindrical hollow body 32 coaxially joined with a second cylindrical hollow body 34 having a greater diameter.

Inside the first cylindrical hollow body 32, at the joining area with the second cylindrical hollow body 34, there are three spokes 36A, 36B, 36C radially arranged and which extend from a common central area where a pin 37 is axially arranged. An annular tab 38 is made on the outside surface of the second cylindrical hollow body 34. Two recesses 40A, 40B, arranged in diametrically opposite directions, are made at the free end 34A of the second cylindrical hollow body 34. Two small holes 42A, 42B are respectively made near the bottom of the recesses 40A, 40B.

Figure 5:
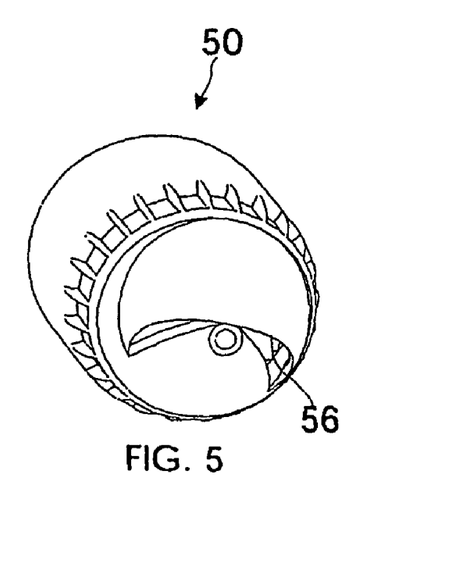
FIGS. 5, 6 and 7 are respectively perspective, longitudinal and bottom views of the main body of the nozzle of the distributor of FIG. 1.
Figure 6:
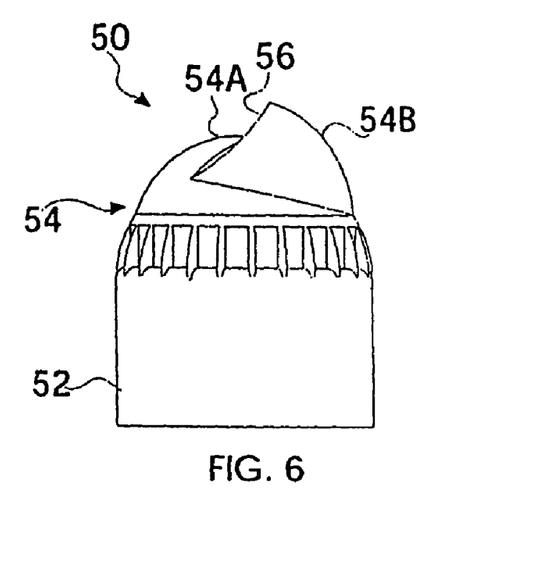
Figure 7:
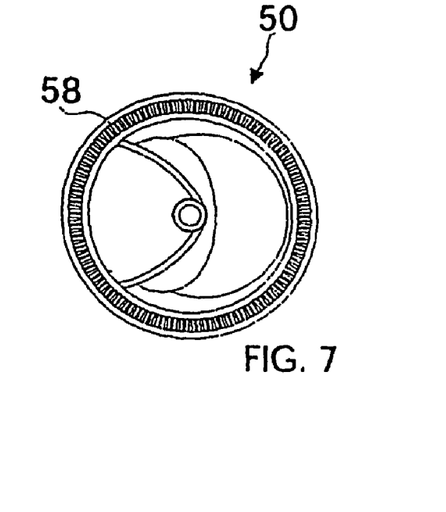

The nozzle 50, as illustrated in FIGS. 5, 6 and 7, comprises a cylindrical hollow body 52 joined with an essentialy semispherical cup 54. More precisely, the cup 54 is composed of two portions 54A, 54B: a first portion 54A which is lowered with respect to a second portion 54B, so as to form an outlet 56 for the water flow which has an angled direction with respect to the axis of the cylindrical hollow body 52.

A toothed crown 58 is provided inside the nozzle 50 at the joined area between the cylindrical body 52 and the cup 54.

A tubular element 60 extends from the upper end of the lowered portion 54A and towards the inside and it is axially and centrally arranged with respect to the nozzle 50, as better illustrated in FIG. 1.

Figure 8:
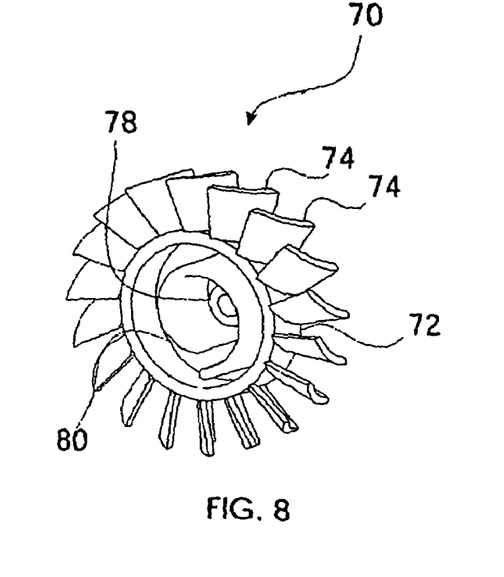
FIGS. 8, 9 and 10 are respectively perspective, side and bottom views of the impeller of the distributor of FIG. 1.
Figure 9:
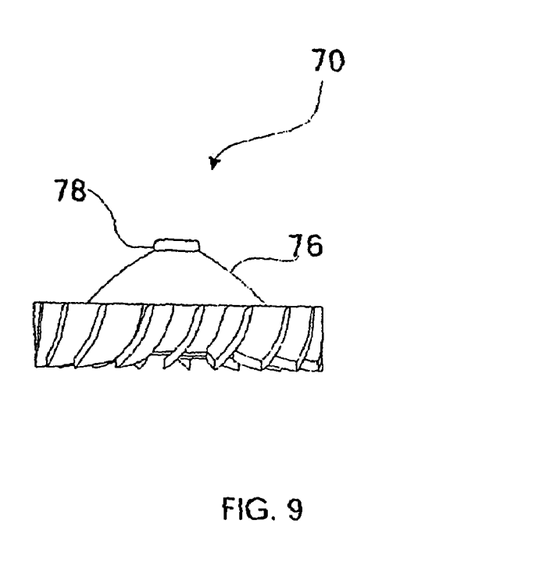
Figure 10:
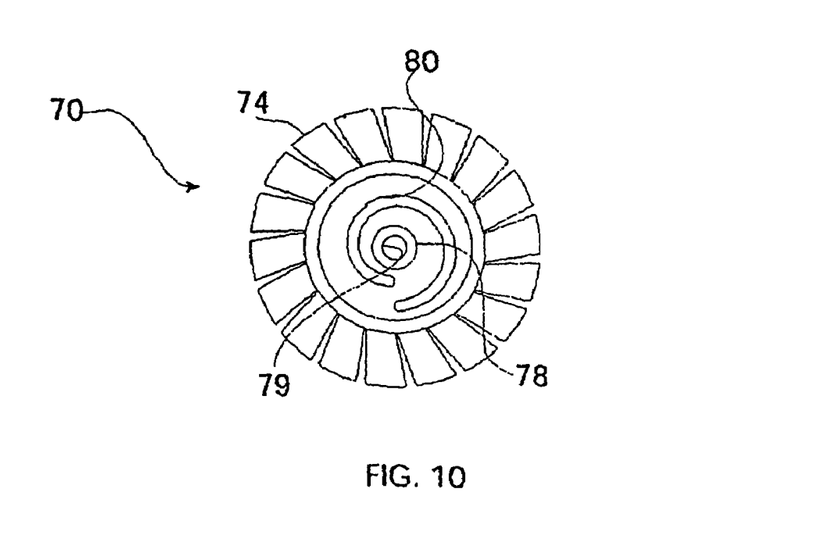

FIGS. 8, 9 and 10 show an impeller 70 which comprises a hub 72 from which a plurality of blades 74 extends out, the shape of which characterizes the impeller as an impeller with an axial flow.

On the hub 72 of the impeller 70, on the side towards the direction of the entering water flow, there is a nose cone 76 from which a cylindrical sleeve 78, having a central hole 79, axially projects, whereas on the opposite side there is a helical grooved profile 80.

Figure 11:
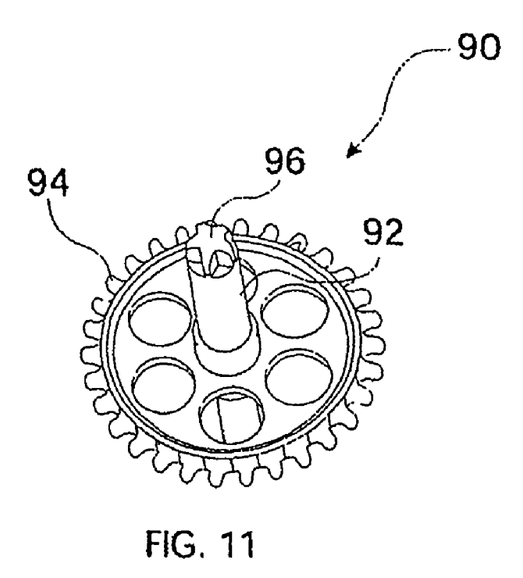
FIGS. 11 and 12 are respectively perspective and longitudinal views of a gear of the distributor of FIG. 1.
Figure 12:
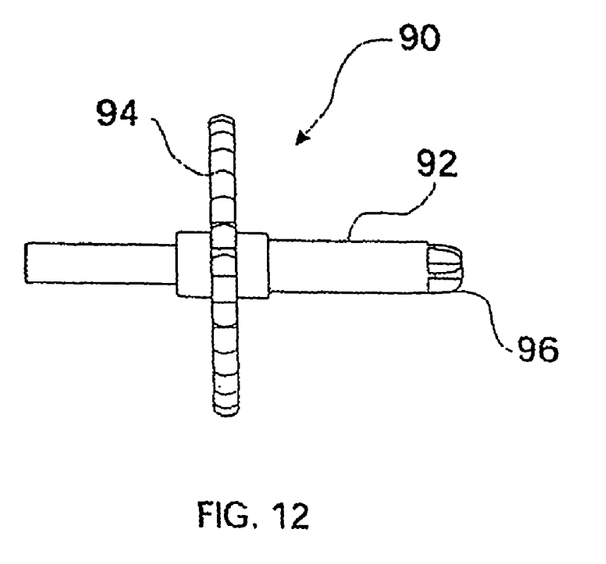

FIGS. 11 and 12 show the gear 90 which comprises a shaft 92 with a toothed wheel 94 mounted in an intermediate position. A pinion 96 is mounted at one free end of the shaft 92.

Figure 13:
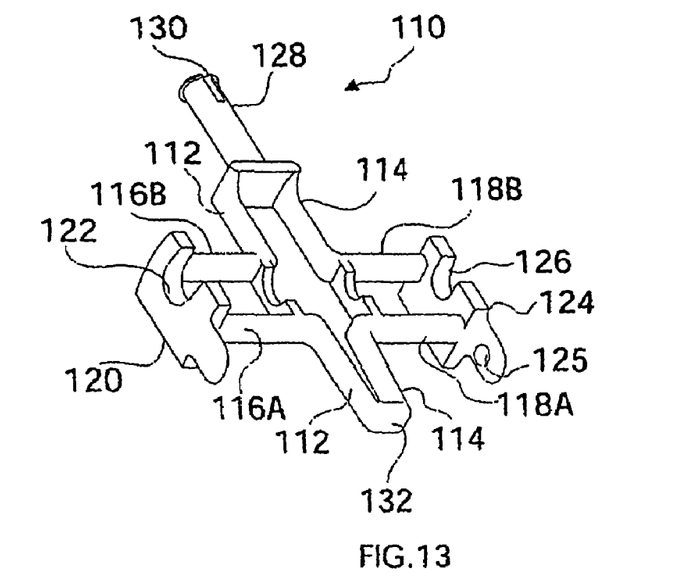
FIG. 13 is a perspective view of a support of the distributor of FIG. 1.

Finally, FIG. 13 shows the support 110 having an essentally cross-like shape and composed of a double stem 112, 114. From the stem 112, a double arm 116A, 116B perpendicularly extends and, symmetrically, also from the stem 114, a double arm 118A, 118B perpendicularly extends.

The free end of the double arm 116A, 116B is provided with a shaped tab 120 onto which a semicircular seat 122 is made; similarly, the free end of the double arm 118A, 118B is provided with a shaped tab 124 onto which a semicircular seat 126 is made. The semicircular seats 122, 126 are able to house and support the shaft 92 of the gear 90 at its ends.

Each of the shaped tabs 120, 124 are provided with a pin 125 directed towards the stems 112, 114.

From one side, the double stem 112, 114 extends with a cylindrical sleeve 128 having a notch 130 at the middle, whereas from the other side it ends with a point 132.

For mounting the entire distributor 20 it is first necessary to mount the gear 90 onto the support 110 and, in particular, the ends of the shaft 92 of the gear 90 are placed into the two semicircular seats 122, 126 of the support 110, as represented in FIG. 1. Subsequently, the support 110 together with the gear 90 is mounted onto the nozzle 50 by simply inserting the sleeve 128 of the support 110 inside the tubular element 60 of the nozzle 50. This operation is facilitated by the notch 130 made at the end of the sleeve 128, so that the sleeve 128 may contract so allowing for an easy fitting.

The impeller 70 is mounted onto the main body 30 by inserting the pin 37 of the main body 30 inside the cylindrical sleeve 78 of the impeller 70.

At last, the nozzle 50 together with the support 110 and the gear 90, is coupled with the main body 30 on which the impeller 70 is mounted, by inserting the second cylindrical hollow body 34 of the main body 30 inside the cylindrical body 52 of the nozzle 50, so that the shaped tabs 120, 124 of the support 110 are respectively housed in the recesses 40A, 40B of the main body 30, and that the pins 125 of the tabs 120, 124 come inside the small holles 42A, 42B made on the main body 30. The annular tab 8 closes all the components inside, namely the support 110, the gear 90 and the impeller 70.

The mounting operation is made in such a manner that the helical grooved profile 80 of the impeller 70 engages the toothing of the toothed wheel 94 of the gear 90 and that the pinion 96 of the gear 90 engages with the toothed crown 58 of the nozzle 50. Also the nose cone 76 of the impeller 70 and the blades of the impeller are orientated towards the direction from which the water comes from.

Consequently, the axis of the impeller 70 and the longitudinal axis of the support 110 are coaxial with the axis of the main body 30 and the nozzle 50, so defining a rotaxion axis, indicated by the letter X in FIG. 1, around which the nozzle 50 rotates with respect to the main body 30, whereas the axis of the gear 90 is perpendicularly arranged with respect to the rotational axis X.

The functioning of the distributor 20 is described below.

The first cylindrical hollow body 32 of the main body 30 is connected to the supply duct of a pump so that the kinetic energy of the water flow which comes into the distributor 20 rotates the impeller 70 and then the helical grooved profile 80. The latter, which in turn engages with the toothing of the toothed wheel 94, rotates the gear 90 and then also the pinion 96. Since the pinion 96 is engaged with the toothed crown 58, it rotates the nozzle 50 around the rotational axis X, thereby the water flow which comes out from the outlet 56 of the nozzle 50 rotates in a spacial way describing a cone and creating in this manner a whirlpool.

The pitch of the toothing of the toothed wheel 94 is such that only one tooth at a time is engaged with the helical grooved profile 80. It is evident that the toothed wheel 94 makes a complete rotation only when the impeller 70 has made a number of revolutions equal to the number of the teeth of the toothed wheel 94, thereby there is a high reduction ratio. The same occurs between the pinion 96 and the toothed crown 58 of the nozzle 50, therefore the number of revolutions per minute of the nozzle 50 is remarkably less than that of the impeller 70.

Consequently, the slow rotation of the nozzle 50 allows for accurately reproducing the natural conditions of the marine environment, such as the coral barrier or reef wherein, due to the waves and currents, whirling motions occur.

Figure 14:
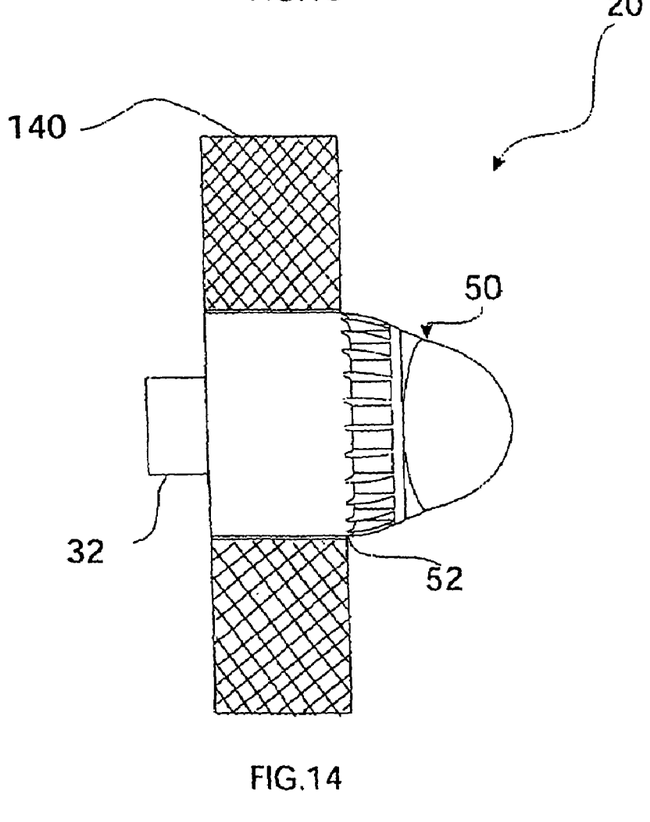
FIG. 14 is a longitudinal view of a distributor wherein a biological filter, represented sectioned, has been mounted.

FIG. 14 shows a distributor 20 wherein a biological aerobic filter 140 is applied on the nozzle 50 and it has an essentially disk-like shape, so that it is possible to insert the cylindrical body 52 of the nozzle 50 into it.

Figure 15:
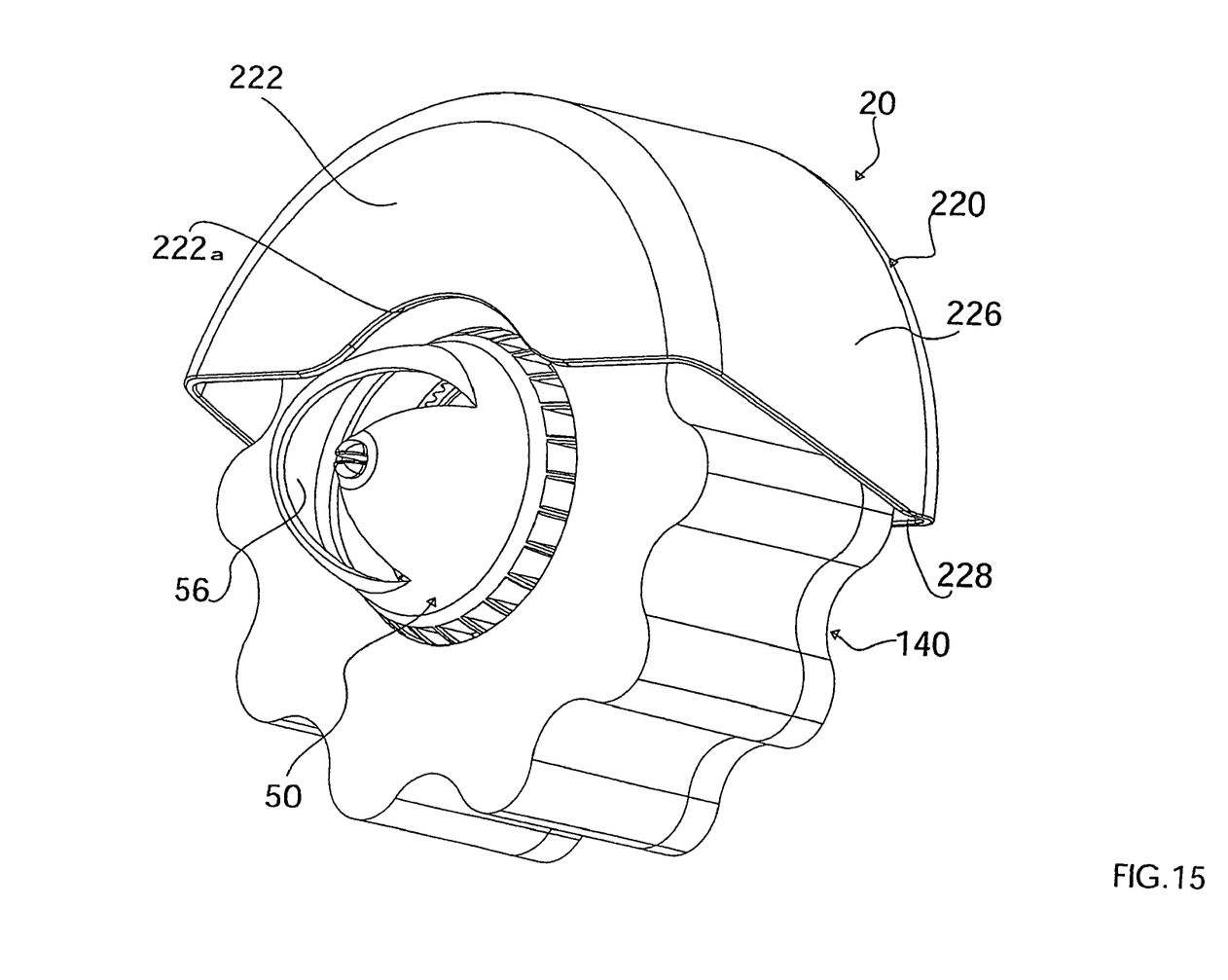
FIG. 15 is a perspective view of the distributor device provided with a filter and a covering element.
Figure 16:
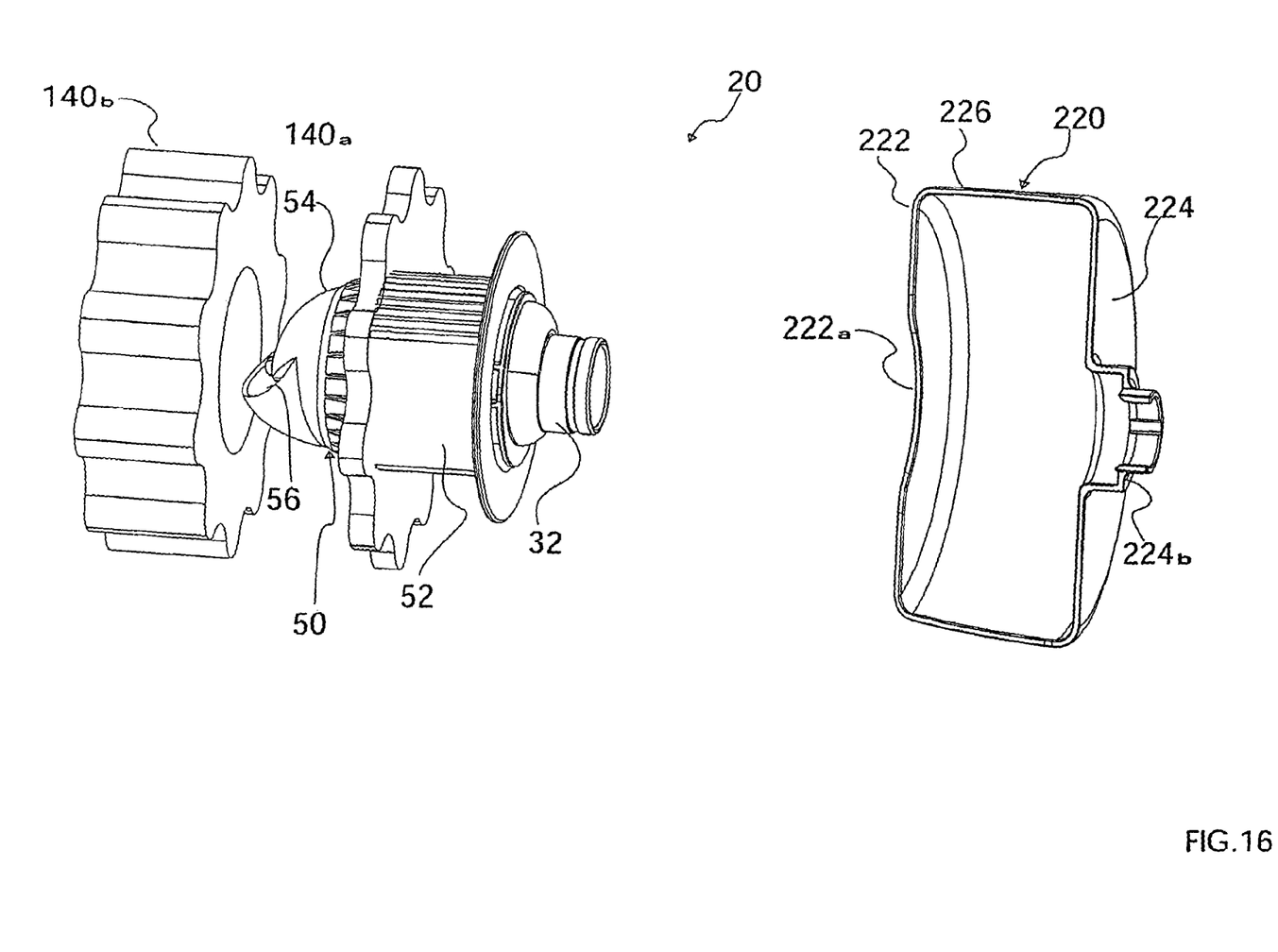
FIG. 16 is an exploded perspective view of the device of FIG. 15.

More precisely, as shown in FIGS. 15 and 16, the filter 140 is composed of two disk-like portions coupled therebetween: a first portion 140a made up of polyether which contains active carbon and a second portion 140b made up of polyether.

A covering element 220 is mounted above the filter, it has a cup-like shape and roundly covers the upper part of the aerobic rotating filter 140.

The covering element 220 comprises two side walls 222, 224 approximately having a semicircular shape and a second semicylindrical wall 226 interposed between the two side walls 222, 224, so as to cover about the half upper portion of the aerobic rotating filter 140. A curved recess 222a is made near the central area of the side wall 222, so as to house the end cap 54 of the nozzle 50 whereas, a semicylindrical sleeve 224b is made on the the side wall 224 and is applied onto the first cylindrical hollow body 32 of the main body 30, so as to fix the covering element 220 to the distributor 20.

For the correct positioning of the distributor 20, it is necessary to position the device so that the aerobic rotating filter 140 and the covering element 220 are completely immersed in water.

During the functioning of the distributor 20, water under pressure coming from a pump slowly rotates both the nozzle 50 and the aerobic filter 140 and, then, it comes out from the outlet 56 of the nozzle 50. Before the water reaches the distributor 20, it is mixed with the air necessary to oxygenate the plants and the animals contained in the aquarium.

A part of the air contained in water is released, because of the unavoidable losses due to gaps existing between the different components of the distributor 20. This air comes up and the majority flows upwards along the rotating filter 140, whereby it is channelled between the rotating filter 140 and the covering element 220, where it is trapped. Consequently, between the aerobic rotating filter 140 and the covering element 220, an air chamber 228 is created wherein the bacteria, contained in the rotating filter 140, may regenerate thanks to the continuous change of air between the filter 140 and the curved recess 222a. In fact, the air which continuously flows into the covering element 220 generates an overpressure of the air contained in the chamber 228 which pushes the air from the upper part of the covering element 220 towards the curved recess 222a where it comes out.

Although the aerobic rotating filter 140 is completely immersed in water, thanks to the covering element 220, the filter is still able to carrying out a filtering action and, at the same time, to regererate due to the air chamber created between the rotating filter 140 and the covering element 220.

Therefore, it is not necessary to worry about the correct position of the distributor, which may be still positioned near the bottom of the aquarium.

The distributor of the present invention may be applied to any equipment or device for pumping and/or filtering water and which can be mounted either inside or outside the aquarium, provided that the distributor is positioned as above indicated with respect to the water level.

It is evident that any conceptually or functionally equivalent variation or modification falls inside the protection field of the present invention.

For example, it is possible to use two pinions for the gear 90, each of them placed on each of the two ends of the shaft 92.

The covering element 220 may cover a greater or a lesser amount of the surface of the aerobic rotating filter 140, but it is preferably that it covers at least 20% of the total surface of the filter in order for it work efficiently.

Moreover, the covering element 220 may be coupled with distributors wherein the nozzle 50 is fixed and only the aerobic filter 140 is rotated.

The distributor may be provided with means in order to adjust the distance between the covering element 220 and the aerobic rotating filter 140, so as to position the covering element 220 in such a way to obtain the maximum efficiency, depending on the power of the water jet.

The invention claimed is:

1. Distributor device for water of aquariums and the like, comprising:

a main body containing motor means kinematically connected to a mobile water nozzle, the motor means including an impeller—which is rotated by the kinetic energy of the water entering into the distributor device—and a gear mechanism—designed to kinematically connect the impeller—with the nozzle, so as -to move the nozzle, characterized in that said nozzle—is rotatably mounted on said main body—so as to rotate around a rotational axis—and said gear mechanism—continuously rotates said nozzle;

wherein a biological aerobic filter is mounted on the rotating nozzle, so that said biological filter rotates together with the nozzle.

2. Distributor device according to claim 1, characterized in that said gear mechanism comprises at least one pinion moved by said impeller and which engages with a toothed crown fixed to said nozzle.

3. Distributor device according to claim 2, characterized in that said gear mechanism comprises a rotating shaft onto which at least said one pinion and a toothed wheel moved by said impeller are mounted.

4. Distributor device according to claim 3, characterized in that said gear mechanism comprises a helical profile fixed to the impeller and which engages with said toothed wheel, so that as said impeller rotates, the helical profile slowly rotates said toothed wheel, said rotating shaft and said at least one pinion which in its turn rotates said rotating nozzle.

5. Distributor device according to claim 4, characterized in that said helical profile fixed to said impeller engages with only one tooth of the toothed wheel at a time, so that the toothed wheel makes only one revolution when the impeller makes a number of revolutions equal to the number of teeth on the toothed wheel.

6. Distributor device according to claim 2, characterized in that said impeller rotates around an axis substantially parallel to the axis of the direction of the water flow.

7. Distributor device according to claim 6, characterized in that said rotating shaft and then the axis of said toothed wheel and the axis of said at least one pinion are essentially perpendicular to the rotational axis of the impeller.

8. Distributor device according to claim 7, characterized in that said toothed crown has a rotational axis essentially parallel to the direction of the water flow, so that the rotational axis (X) of said rotating nozzle is essentially parallel to the direction of the water flow.

9. Distributor device according to claim 6, characterized in that said impeller is an impeller with an essentially axial flow.

10. Distributor device according to claim 2, characterized in that said at least one pinion are two in number, each placed at the two ends of said rotating shaft.

11. Distributor device according to claim 1, characterized in that said nozzle has an outlet for the exit water flow oriented in an angled direction with respect to the rotational axis (X) of the nozzle.

12. Distributor device according to claim 11, characterized in that said nozzle comprises an essentialy cylindrical portion rotatably coupled to said main body, and an essentially semispheric end cup divided in two portions, a first portion lowered with respect to a second portion so as to form said outlet for the exit water flow.

13. Distributor device according to claim 1, characterized in that it comprises a covering element positioned above said aerobic rotating filter and it covers at least an upper portion of said aerobic rotating filter.

14. Distributor device according to claim 13, characterized in that said covering element is placed at a prefixed distance from said rotating filter, so that an air chamber is defined between said aerobic rotating filter and said covering element.

15. Distributor device according to claim 14, characterized in that said chamber traps a part of the air released by the water jet created by the nozzle when the distributor is positioned so that said rotating filter is completely immersed in water, so creating an air chamber which enables the aerobic regeneration for the rotating filter.

16. Distributor device according to claim 15, characterized in that said covering element covers at least 20% of the surface of said aerobic rotating filter.

17. Distributor device according to claim 15, characterized in that it comprises means for adjusting the distance between the aerobic rotating filter and said covering element.

18. Distributor device according to claim 1, characterized in that said aerobic rotating filter has a disk-like shape and said covering element has a cup-like shape which fits to the shape of said aerobic rotating filter.

19. Distributor device according to claim 18, characterized in that said covering element comprises two side walls having an essentially semicircular shape and a semicylindrical wall interposed between said two side walls.

20. Distributor device according to claim 19, characterized in that near the central area of said side wall, there is a curved recess able to house said nozzle.

21. Distributor device according to claim 20, characterized in that it comprises a first cylindrical hollow body and said side wall of said covering element comprises a semicylindrical sleeve designed to be mounted on said first cylindrical hollow body, so as to fix the covering element to the distributor.

* * * * *